June 13, 1961 A. R. CUNNINGHAM 2,987,868
STALK SHREDDER
Filed Dec. 8, 1958 2 Sheets-Sheet 2
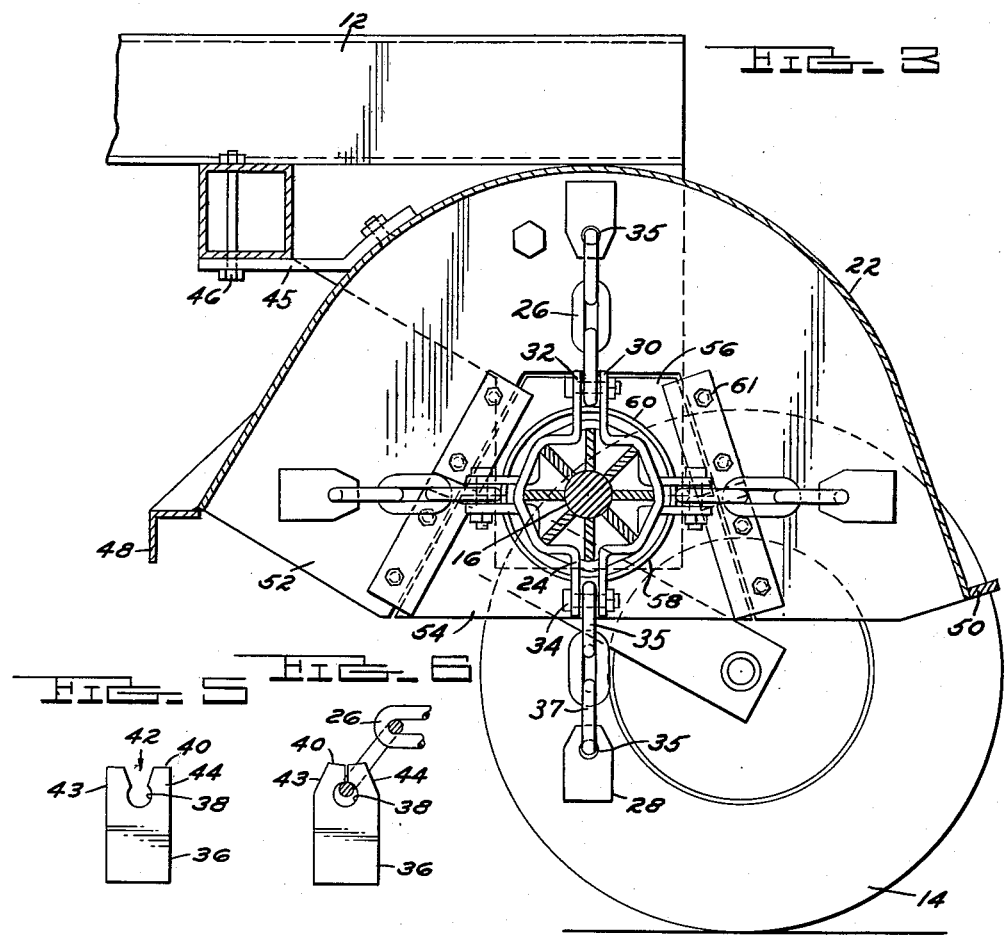
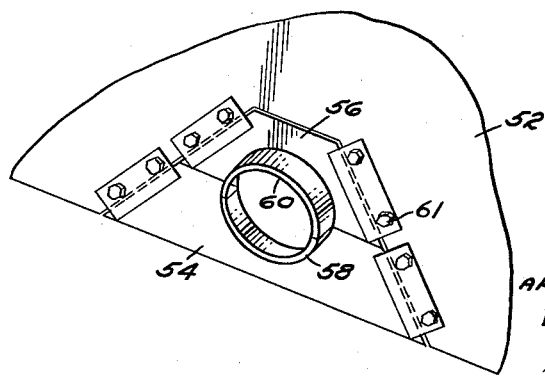
INVENTOR.
ARTHUR RAYMOND CUNNINGHAM
BY Whittemore,
Hulbert & Belknap
ATTORNEYS

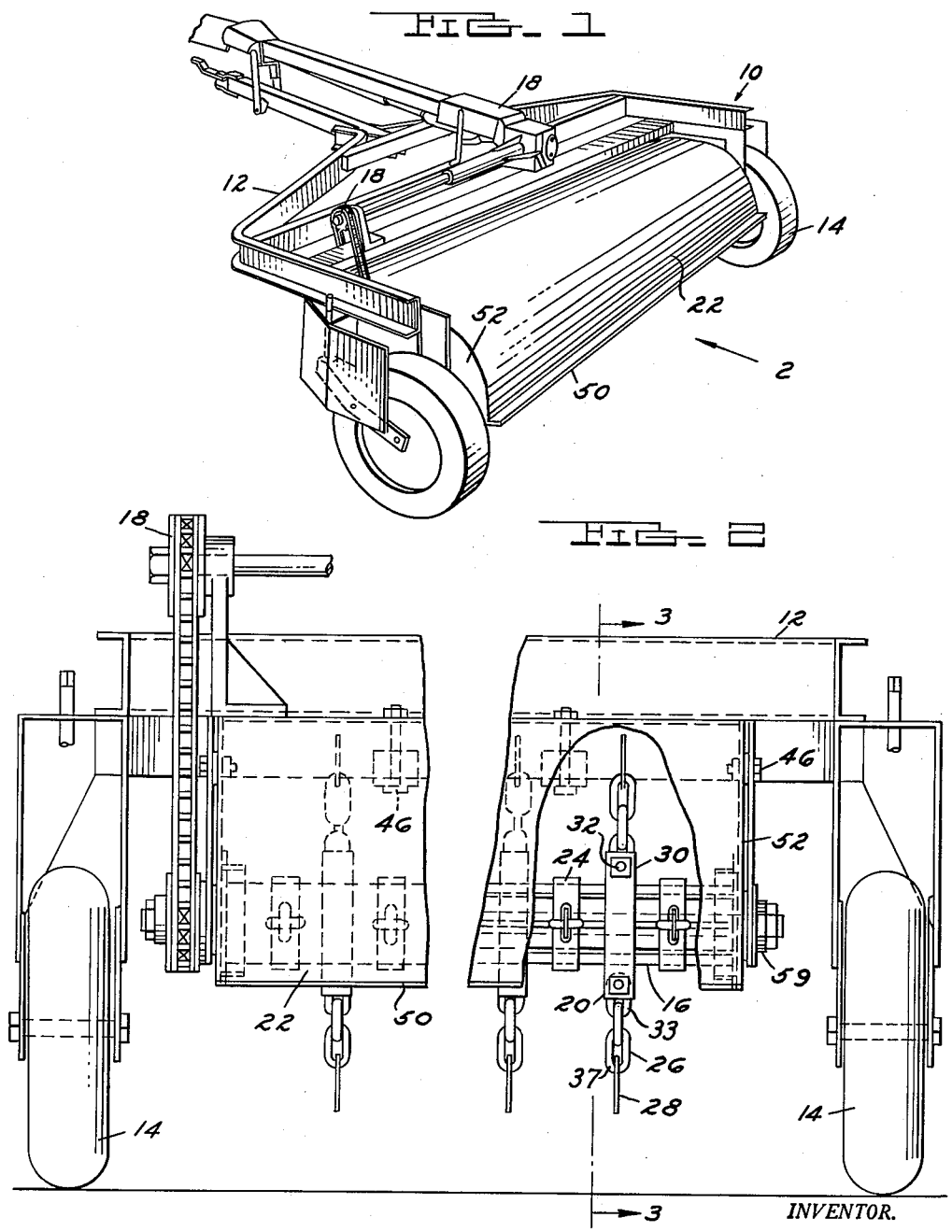

United States Patent Office 2,987,868
Patented June 13, 1961

2,987,868
STALK SHREDDER
Arthur Raymond Cunningham, Chicago, Ill., assignor to Cunningham & Sons, Chicago, Ill., a partnership
Filed Dec. 8, 1958, Ser. No. 778,941
5 Claims. (Cl. 56—504)

This invention relates to a stalk shredder and refers more particularly to a machine for shredding the stalks of crops which have been cut and are lying in open fields.

In the past stalks of crops such as corn have been cut and left in fields to dry after which they were gathered and stored for later use. A great deal of time is required to dry unshredded stalks. Also the unshredded stalks are usually of a size which is difficult to handle efficiently in gathering. Shredding crop stalks in the fields after they have been cut decreases the time required to dry the stalks and makes them easier to handle.

Therefore it is one of the essential objects of the present invention to provide a stalk shredding machine to shred the stalks of crops in the fields where they have been cut.

Another object is to provide a machine having a rotating roll thereon with flails clamped to the roll for shredding the stalks of crops.

Another object is to provide replaceable flails for a machine having flails thereon for shredding the stalks of crops.

Another object is to provide a machine for shredding crop stalks which machine has rotating flails and a cover over said flails which cover is formed to be closer to the outer edges of the flails when they are in the upper vertical position than when they are in the horizontal position.

Another object is to provide a machine for shredding crop stalks including a rotating roll set in bearings with guards to prevent undesirable accumulations of material from winding around the roll at the bearings.

Another object is to provide a machine for shredding crop stalks which machine is simple in construction, easy to manufacture and efficient in use.

The foregoing and other important objects and desirable features inherent in and encompassed by the invention will become apparent as a preferred embodiment of the invention is fully disclosed in the following description and accompanying drawings, in which:

FIGURE 1 is a perspective view of a stalk shredding machine according to the present invention.

FIGURE 2 is a partially broken away fragmentary view of the stalk shredding device of FIGURE 1 as it would appear when viewed from the direction indicated by arrow 2 in FIGURE 1.

FIGURE 3 is an enlarged partial cross section of the crop shredder of FIGURE 1 taken on line 3—3 in FIGURE 2.

FIGURE 4 is an enlarged fragmentary view of an end panel of the cover of the crop shredder of FIGURE 1 showing removable end plates having bearing protecting flanges according to the invention.

FIGURE 5 is an enlarged view of a replaceable flail plate according to the invention before its attachment to a flail chain.

FIGURE 6 is an enlarged view of a replaceable flail plate according to the invention after its attachment to a flail chain.

According to the present invention a crop treating machine such as that disclosed in United States Patent Number 2,711,622 adapted to be drawn across a field in which cut crops are laying and having a rotating roll is provided with a cover over said roll and flails attached to the roll whereby crops are picked up and shredded as the machine passes over them.

In the embodiment of the invention illustrated a crop treating machine generally designated 10, including a frame 12, wheels 14 mounted on the frame 12, a rotary roll 16 attached to frame 12, and drive means for the rotary roll also mounted on frame 12 is shown. Detachable flails 20 mounted on roll 16 and a cover 22 over roll 16 and flails 20 are also provided on the crop treating machne 10 as illustrated for shredding crop stalks.

The particular frame 12, wheels 14, rotary roll 16 and drive means 18 shown are not considered essential to the invention and therefore will not be considered further. A complete disclosure of these elements is found in the specification of United States patent referred to above. The modification of the rotary crop treating device disclosed in the aforesaid patent so that it can be used as a stalk shredder according to the present invention is in fact contemplated by applicant and therefore the flails 20 and cover 22 of machine 10 will be discussed with reference to a frame 12, wheels 14, rotary roll 16 and drive means 18 as disclosed in the patent referred to above and illustrated in the drawings.

A detachable flail 20 includes two clamp members 24, two lengths of chain 26 and two flail plates 28. Clamps 24 are secured to roll 16 of machine 10. Chains 26 are attached to clamps 24 and rotate with said roll. Flail plates 28 are secured to the free ends of chains 26.

The clamp members 24 are generally half circular shaped as shown to form a substantially complete non-slipping band around roll 16 when assembled. Clamp members 24 are provided with lips 30 at each end thereof having holes 32 extending therethrough as indicated. Bolts 34 are provided extending through holes 32 in clamp members 24 holding clamps 24 in place on roll 16.

The short chain lengths 26 are secured to said clamps by means of passing the bolts 34 through the end links of chains 26, and the end links 33 of chains 26 being positioned between lips 30 of clamps 24. Since the clamps are essentially half circular the chains are thus mounted directly opposite each other across roll 16 in assembly.

Flail plates 28 are provided on the free ends of chains 26. Flail plates 28 as illustrated are substantially flat rectangular members having an opening therethrough at one end as indicated at 35. The end link 37 of chain 26 passes through opening 35 thereby securing the flail plates 28 to chain 26. In manufacture flail plates 28 may be made integrally with chain length 26.

Flail plates 28 may eventually wear out after prolonged use. Therefore replaceable flail plates 36 as illustrated are provided by applicant. Replaceable flail plates 36 are substantially flat rectangular plates having openings 38 therethrough near end 40 thereof similar to original flail plates 28. Flail plates 36 are further provided with an opening 42 between opening 38 and end 40 to allow insertion of the end link 37 of chain 26 into opening 38. The installation of replaceable flail plate 36 on chain 26 is completed after insertion of the end link 37 of chain 26 into opening 38 by applying pressure between sides 43 and 44 thereof at end 49 to close opening 42. The final installation of replaceable flail plate 36 appears as illustrated in FIGURE 6.

Detachable flails 20 are symmetrically spaced along roll 16 as shown. The chain links on alternate flails being positioned to extend at right angles to each other whereby the balance of roll 16 is maintained.

Cover 22 of machine 10 may be attached to frame 12 by brackets 45 and bolts 46 as illustrated. Cover 22 is positioned on frame 12 so as to extend over roll 16.

Cover 22 is generally arcuate in cross-section and is provided with stiffening members 48 and 50 at the longitudinal edges thereof. End panels 52 as shown enclose the greater portion of the ends of cover 22.

Cover 22 is formed and placed so that the distance between the ends of flails 20 and cover 22 is greater when flails 20 are extended in the horizontal plane than when they are extended vertically upwards. This allows stalks thrown upward by rotating flails 20 to easily pass into the area between cover 22 and flails 20 and then to be shredded by flails 20 as the distance between flails 20 and cover 22 decreases.

Removable end plates 54 and 56 are provided in conjunction with each end panel 52. End plates 54 and 56 in the form shown are each provided with a half circular flange 58 and 60, respectively, extending inwardly of cover 22 over the ends of roll 16 and roll mounting bearing 59. In assembly as shown with plates 54 and 56 removably bolted to end panels 52 of cover 22 by means of bolts 61, bearing 59 and the ends of roll 16 are prevented from wrapping with material collected by the rotating flails 20 by flanges 58 and 60 which form a cylindrical sleeve over bearing 59 and the ends of roll 16. Since both end plates 54 and 56 are removable the installation and removal of cover 22 with respect to machine 10 is facilitated.

As previously indicated the rotary crop treating device disclosed in United States Patent 2,711,622 may be modified to provide a crop shredding machine according to this invention. In such modification it would be necessary to remove the front roll and cover of the machine disclosed and transfer the drive to the rear roll. The attachment of flails 20 and a cover 22 as above set forth would complete the transformation of the device disclosed in the aforementioned patent into a stalk shredder.

In operation a stalk shredder 10 as described above is drawn across a field in which stalks to be shredded are laying. As the stalk shredder 10 advances the rotating flails 20 contact the stalks, throwing them upward between the cover 22 and flails 20. The stalks pass over the roller 16 and in so doing are shredded by the action of flails 20 in conjunction with cover 22. The shredded stalks are then positively discharged from the stalk shredder back onto the field by flails 20. During this operation roll 16 and bearing 59 are protected from being jammed at either end of roll 16 by flanges 58 and 60 on end plates 54 and 56 of cover 22.

What I claim as my invention is:

1. In a stalk shredder, a roll, clamps embracing opposite sides of said roll, said clamps having generally C-shaped central portions extending about and engaging opposite sides of said roll, each central portion terminating at each end in opposed relation to the corresponding end of the other central portion to provide pairs of opposed ends, opposed flanges projecting radially outwardly from each pair of opposed ends, elements connecting said opposed flanges to secure said clamps on said roll, and flails carried by said elements.

2. The structure defined in claim 1 wherein said roll has a plurality of circumferentially spaced radially outwardly projecting blades extending lengthwise of said roll, and wherein said generally C-shaped central portions of said clamps conform to and engage the tips of said blades.

3. The structure defined in claim 2 wherein a pair of said blades project radially outwardly in diametrically opposite directions between the opposed ends of said central portions of said clamps, wherein said opposed flanges project outwardly beyond the tips of said pair of blades, and wherein said elements extend across the tips of said pair of blades radially outwardly therefrom.

4. The structure defined in claim 1 wherein each flail includes a link chain connected at one end to one of said elements and having a flail plate at the opposite end, each flail plate having a bifurcated end portion the inner margins of the legs of which define a notch, the bottom portion of said notch fitting about a link of the associated link chian and the sides of said notch extending from the bottom portion thereof to the end of said plate in closely adjacent relation to prevent the link from being accidentally withdrawn from said bottom portion, said legs being capable of being bent away from one another to separate said sides sufficiently to permit withdrawal of said link from the bottom of said notch.

5. In a stalk shredder, a roll, clamps embracing opposite esides of said roll, said clamps having generally C-shaped central portions extending about and engaging opposite sides of said roll, each central portion terminating at each end in opposed relation to the corresponding end of the other central portion to provide pairs of opposed ends, opposed flanges projecting radially outwardly from each pair of opposed ends, means connecting each pair of opposed flanges together to secure said clamps on said roll, said opposed flanges and connecting means therefor providing diametrically opposite flail mounting projections, and flails carried by said flail mounting projections.

References Cited in the file of this patent

UNITED STATES PATENTS

| | | |
|---|---|---|
| 1,786,978 | Aronson | Dec. 30, 1930 |
| 2,529,358 | Slater | Nov. 7, 1950 |
| 2,531,732 | Hoffman | Nov. 28, 1950 |
| 2,580,640 | Bartch et al. | Jan. 1, 1952 |
| 2,618,112 | Iucker et al. | Nov. 18, 1952 |
| 2,656,662 | Hines | Oct. 27, 1953 |
| 2,701,940 | Carr | Feb. 15, 1955 |
| 2,701,941 | Heth | Feb. 15, 1955 |